United States Patent
Tang et al.

(10) Patent No.: US 11,930,455 B2
(45) Date of Patent: Mar. 12, 2024

(54) METHOD FOR CONTROLLING NETWORK CONNECTION, TERMINAL AND NON-TRANSITORY STORAGE MEDIUM

(71) Applicant: GUANGDONG OPPO MOBILE TELECOMMUNICATIONS CORP., LTD., Guangdong (CN)

(72) Inventors: Kai Tang, Guangdong (CN); Yang Xia, Guangdong (CN); Tao Zhang, Guangdong (CN); Yan Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 91 days.

(21) Appl. No.: 17/525,550

(22) Filed: Nov. 12, 2021

(65) Prior Publication Data
US 2022/0070760 A1 Mar. 3, 2022

Related U.S. Application Data

(63) Continuation-in-part of application No. PCT/CN2020/090693, filed on May 15, 2020.

(30) Foreign Application Priority Data

May 16, 2019 (CN) .......................... 201910405971.7
Sep. 16, 2019 (CN) .......................... 201910869968.0

(51) Int. Cl.
*H04W 52/02* (2009.01)
*H04L 1/00* (2006.01)
*H04L 5/00* (2006.01)
*H04W 24/08* (2009.01)
*H04W 24/10* (2009.01)
*H04W 28/02* (2009.01)
(Continued)

(52) U.S. Cl.
CPC ....... *H04W 52/0258* (2013.01); *H04L 1/0002* (2013.01); *H04L 5/0055* (2013.01);
(Continued)

(58) Field of Classification Search
CPC . H04W 52/0258; H04W 24/08; H04W 24/10; H04W 28/0278; H04W 36/0069;
(Continued)

(56) References Cited

U.S. PATENT DOCUMENTS

| | | |
|---|---|---|
| 9,414,298 B1 | 8/2016 | Pasupuleti et al. |
| 2015/0045035 A1 | 2/2015 | Nigam et al. |

(Continued)

FOREIGN PATENT DOCUMENTS

| | | |
|---|---|---|
| CN | 101064916 | 10/2007 |
| CN | 101217824 | 7/2008 |

(Continued)

OTHER PUBLICATIONS

CNIPA, Notification to Grant Patent Right for Invention for CN Application No. 201910869968.0, dated Mar. 14, 2022.
(Continued)

*Primary Examiner* — Natasha W Cosme
*Assistant Examiner* — Yewon Kim
(74) *Attorney, Agent, or Firm* — Hodgson Russ LLP (57) ABSTRACT

Embodiments of the present application provide a method for controlling a network connection, a terminal and a non-transitory storage medium. The method includes: detecting a state of a terminal, where the terminal is configured to communicate with both of a first base station and a second base station in the dual connectivity mode and the state of the terminal represents a connection status between the terminal and a network where the first base station locates; and prohibiting the terminal from connecting with the second base station in response to the state of the terminal representing the terminal is in an idle state and the terminal having been in the idle state for a predetermined time.

20 Claims, 5 Drawing Sheets

(51) Int. Cl.
| | |
|---|---|
| *H04W 28/086* | (2023.01) |
| *H04W 36/00* | (2009.01) |
| *H04W 36/30* | (2009.01) |
| *H04W 48/02* | (2009.01) |
| *H04W 48/20* | (2009.01) |
| *H04W 60/00* | (2009.01) |
| *H04W 60/04* | (2009.01) |
| *H04W 76/15* | (2018.01) |
| *H04W 76/18* | (2018.01) |
| *H04W 76/19* | (2018.01) |
| *H04W 76/20* | (2018.01) |
| *H04W 76/30* | (2018.01) |
| *H04W 76/34* | (2018.01) |
| *H04W 88/06* | (2009.01) |
| *H04W 84/02* | (2009.01) |
| *H04W 88/08* | (2009.01) |
| *H04W 92/02* | (2009.01) |
| *H04W 92/10* | (2009.01) |

(52) U.S. Cl.
CPC ............ *H04W 24/08* (2013.01); *H04W 24/10* (2013.01); *H04W 28/0278* (2013.01); *H04W 28/0865* (2023.05); *H04W 36/0069* (2018.08); *H04W 36/00698* (2023.05); *H04W 36/0085* (2018.08); *H04W 36/305* (2018.08); *H04W 48/02* (2013.01); *H04W 48/20* (2013.01); *H04W 52/0212* (2013.01); *H04W 52/0261* (2013.01); *H04W 52/028* (2013.01); *H04W 60/005* (2013.01); *H04W 60/04* (2013.01); *H04W 76/15* (2018.02); *H04W 76/18* (2018.02); *H04W 76/19* (2018.02); *H04W 76/20* (2018.02); *H04W 76/30* (2018.02); *H04W 76/34* (2018.02); *H04W 84/02* (2013.01); *H04W 88/06* (2013.01); *H04W 88/08* (2013.01); *H04W 92/02* (2013.01); *H04W 92/10* (2013.01); *Y02D 30/70* (2020.08)

(58) Field of Classification Search
CPC ............ H04W 36/0085; H04W 36/305; H04W 48/02; H04W 52/0212; H04W 52/0261; H04W 60/04; H04W 76/15; H04W 76/18; H04W 76/19; H04W 76/20; H04W 76/30; H04W 76/34; H04W 88/06; H04W 48/16; H04W 48/18; H04W 48/20; H04W 52/0251; H04W 52/0267; H04W 52/0274; H04W 52/0254; H04W 52/028; H04W 52/0225; H04W 76/16; H04L 1/0002; H04L 5/0055; Y02D 30/70
See application file for complete search history.

(56) References Cited

U.S. PATENT DOCUMENTS

| | | | |
|---|---|---|---|
| 2016/0127998 A1 | 5/2016 | Roessel et al. | |
| 2016/0242191 A1 | 8/2016 | Liao et al. | |
| 2016/0242226 A1 | 8/2016 | Fushiki et al. | |
| 2017/0171786 A1 | 6/2017 | Mochizuki et al. | |
| 2017/0215185 A1 | 7/2017 | Fukuta et al. | |
| 2018/0220294 A1 | 8/2018 | Ukil et al. | |
| 2018/0220483 A1 | 8/2018 | Hayashi | |
| 2019/0037425 A1 | 1/2019 | Hong et al. | |
| 2019/0101970 A1 | 4/2019 | Ge et al. | |
| 2020/0008152 A1 | 1/2020 | Stauffer et al. | |
| 2020/0100181 A1* | 3/2020 | Jia .................... | H04W 48/12 |
| 2020/0145986 A1 | 5/2020 | Park et al. | |
| 2020/0351771 A1 | 11/2020 | Geekie et al. | |
| 2020/0351792 A1* | 11/2020 | Ghelichi ............. | H04L 43/16 |
| 2021/0028976 A1 | 1/2021 | Jia et al. | |
| 2021/0185753 A1* | 6/2021 | Mattam ............... | H04W 76/30 |
| 2021/0329723 A1 | 10/2021 | Teyeb et al. | |

FOREIGN PATENT DOCUMENTS

| | | |
|---|---|---|
| CN | 101459974 | 6/2009 |
| CN | 104159281 | 11/2014 |
| CN | 104427596 | 3/2015 |
| CN | 105144833 | 12/2015 |
| CN | 105307269 A | 2/2016 |
| CN | 105745957 | 7/2016 |
| CN | 105915886 | 8/2016 |
| CN | 205490137 | 8/2016 |
| CN | 107872851 | 4/2018 |
| CN | 207382188 | 5/2018 |
| CN | 108134657 | 6/2018 |
| CN | 108156670 | 6/2018 |
| CN | 108270709 | 7/2018 |
| CN | 207611273 | 7/2018 |
| CN | 108401537 | 8/2018 |
| CN | 108566672 | 9/2018 |
| CN | 108632880 | 10/2018 |
| CN | 108738115 | 11/2018 |
| CN | 108886733 A | 11/2018 |
| CN | 109151921 | 1/2019 |
| CN | 109168179 A | 1/2019 |
| CN | 109246846 | 1/2019 |
| CN | 109257777 A | 1/2019 |
| CN | 109314895 | 2/2019 |
| CN | 109314966 | 2/2019 |
| CN | 109327886 | 2/2019 |
| CN | 109429263 | 3/2019 |
| CN | 109462527 A | 3/2019 |
| CN | 109548107 A | 3/2019 |
| CN | 109587757 | 4/2019 |
| CN | 110300461 | 10/2019 |
| CN | 110557781 | 12/2019 |
| CN | 110913504 | 3/2020 |
| CN | 110677869 | 8/2021 |
| EP | 2592874 | 5/2013 |
| EP | 2879306 | 6/2015 |
| EP | 2983445 | 2/2016 |
| EP | 3016449 | 5/2016 |
| EP | 3048748 | 7/2016 |
| EP | 3328119 | 5/2018 |
| EP | 3331192 | 6/2018 |
| EP | 3461219 | 3/2019 |
| EP | 3462788 | 4/2019 |
| EP | 3565298 | 11/2019 |
| EP | 3606223 | 2/2020 |
| EP | 3691400 | 8/2020 |
| EP | 3720240 | 10/2020 |
| WO | 2013140202 | 9/2013 |
| WO | 2015113289 | 8/2015 |
| WO | 2018045804 | 3/2018 |
| WO | 2018121382 | 7/2018 |
| WO | 2018125686 | 7/2018 |
| WO | 2018126547 | 7/2018 |
| WO | 2018130115 | 7/2018 |
| WO | 2018174038 | 9/2018 |
| WO | 2018174791 | 9/2018 |
| WO | 2018202777 | 11/2018 |
| WO | 2019004667 | 1/2019 |
| WO | 2019062616 | 4/2019 |
| WO | 2019065814 | 4/2019 |
| WO | 2019118157 | 6/2019 |
| WO | 2020223520 | 11/2020 |
| WO | 2020251815 | 12/2020 |
| WO | 2021030422 | 2/2021 |
| WO | 2021052244 | 3/2021 |
| WO | 2021115030 | 6/2021 |
| WO | 2021126798 | 6/2021 |

OTHER PUBLICATIONS

CNIPA, Decision of Rejection for CN Application No. 201910869972.7, dated Mar. 23, 2022.

(56) References Cited

OTHER PUBLICATIONS

CNIPA, Reexamination Decision for CN Application No. 201910869562.2, dated Mar. 31, 2022.
EPO, Extended European Search Report for EP Application No. 20806210.9, dated Mar. 23, 2022.
EPO, Extended European Search Report for EP Application No. 20805778.6, dated Mar. 25, 2022.
CNIPA, Notification to Grant Patent Right for Invention for CN Application No. 202110429949.3, dated Apr. 20, 2022.
EPO, Extended European Search Report for EP Application No. 20806215.8, dated May 4, 2022.
EPO, Extended European Search Report for EP Application No. 20805914.7, dated May 12, 2022.
EPO, Extended European Search Report for EP Application No. 20806080.6, dated May 2, 2022.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300, Mar. 2019, v15.5.0.
EPO, Extended European Search Report for EP Application 20806478.2, dated May 31, 2022.
EPO, Extended European Search Report for EP Application 20806524.3, dated Jun. 29, 2022.
CNIPA, First Office Action for CN Application No. 202110429949.3, dated Feb. 24, 2022.
CNIPA, Notification of Reexamination for CN Application No. 201910869562.2, dated Dec. 30, 2021.
CNIPA, Reexamination Decision for CN Application No. 201910869968.0, dated Feb. 25, 2022.
CNIPA, First Office Action for CN Application No. 201910870646.8, dated Feb. 15, 2022.
CNIPA, Third Office Action for CN Application No. 201910869972.7, dated Jan. 10, 2022.
Vivo, "Impacts of dual camping UE," 3GPP TSG-RAN WG2 Meeting #99bis, R2-1710927, Oct. 2017, 6 pages.
Qualcomm Incorporated et al., "Consideration on the GSMA NR indication requirements," 3GPP TSG-RAN WG2 Meeting #101, R2-1803664, Feb. 2018, 3 pages.
CNIPA, First Office Action for CN Application No. 201910869968.0, dated Oct. 12, 2020.
CNIPA, Second Office Action for CN Application No. 201910869968.0, dated Jan. 28, 2021.
CNIPA, Third Office Action for CN Application No. 201910869968.0, dated Apr. 27, 2021.
CNIPA, Decision of Rejection for CN Application No. 201910869968.0, dated Jul. 6, 2021.
WIPO, International Search Report for PCT Application No. PCT/CN2020/090693, dated Jul. 29, 2020.
CNIPA, Reexamination Decision for CN Application No. 201910869972.7, dated Oct. 31, 2022.
CNIPA, Notice to Grant Patent Right for Invention for CN Application No. 201910869972.7, dated Nov. 15, 2022.
CNIPA, Decision of Rejection for CN Application No. 201910870646.8, dated Dec. 23, 2022.
EPO, Communication for EP Application No. 20806210.9, dated Jul. 14, 2023.
EPO, Communication for EP Application No. 20805778.6, dated Aug. 4, 2023.
USPTO, Notice of Allowance for U.S. Appl. No. 17/523,557, dated Aug. 18, 2023.
USPTO, Non-Final Office Action for U.S. Appl. No. 17/523,557, dated Apr. 27, 2023.
USPTO, Office Action issued for U.S. Appl. No. 17/526,752, dated Dec. 7, 2023.
USPTO, Office Action issued for U.S. Appl. No. 17/526,797, dated Dec. 21, 2023.
CNIPA, First Office Action issued for CN Application No. 202111213586.6, dated Jan. 4, 2024.
CNIPA, First Office Action issued for CN Application No. 202111214103.4, dated Jan. 11, 2024.
USPTO, Office Action issued for U.S. Appl. No. 17/510,354, dated Jan. 19, 2024.

\* cited by examiner

METHOD FOR CONTROLLING NETWORK CONNECTION, TERMINAL AND NON-TRANSITORY STORAGE MEDIUM

CROSS-REFERENCE TO RELATED APPLICATIONS

This application is a continuation-in-part of International Application No. PCT/CN2020/090693, filed on May 15, 2020, which claims priority to Chinese Application No. 201910405971.7, filed on May 16, 2019, and Chinese Application No. 201910869968.0, filed on Sep. 16, 2019. The entire disclosures of the aforementioned applications are incorporated herein by reference.

TECHNICAL FIELD

The disclosure relates to the field of wireless technology, and more particularly, to a method for controlling a network connection, a terminal and a non-transitory storage medium.

BACKGROUND

A fifth generation (5G) mobile communication system supports a standalone (SA) architecture and a non-standalone (NSA) architecture, and a typical NSA architecture is a dual connectivity (DC) architecture.

In the DC architecture, a terminal can operate in a dual connectivity mode. In the dual connectivity mode, the terminal communicates with two base stations. For example, the terminal communicates with both of a Long Term Evolution (LTE) base station and a New Radio (NR) base station, which results in a large power consumption of the terminal.

SUMMARY

Embodiments of the disclosure provide a method, a terminal, and a storage medium for controlling a network connection, which can save power consumption of a terminal, thereby improving the endurance time of the terminal.

Embodiments of the disclosure provide a method for controlling a network connection. The method includes: detecting a state of a terminal, where the terminal is configured to communicate with both of a first base station and a second base station in the dual connectivity mode and the state of the terminal represents a connection status between the terminal and a network where the first base station locates; and prohibiting the terminal from connecting with the second base station in response to the state of the terminal representing the terminal is in an idle state and the terminal having been in the idle state for a predetermined time.

Embodiments of the disclosure provide a terminal, which is configured to communicate with both of a first base station and a second base station in a dual connectivity mode. The terminal includes a memory and a processor coupled to the memory, the memory stores programs which, when being executed by the processor, cause the processor to implement operations of: detecting a connection status between the terminal and a network where the first base station locates; and prohibiting the terminal from connecting with the second base station in response to that the connection status indicates the terminal is in an idle state and the terminal has been in the idle state for a predetermined time.

Embodiments of the disclosure provide a non-transitory storage medium, and the storage medium stores program codes which, when being executed by a processor, cause the processor to implement operations of: detecting a connection status between a terminal and a master base station, where the terminal is in a dual connectivity mode and capable of communicating with both of the master base station and a secondary base station, and the connection status indicates whether the terminal has established a communication connection with the master base station; comparing a length of time for the connection status with a predetermined time, where the length of time is for which the terminal does not establish the communication connection with the master base station; and prohibiting the terminal from connecting with the secondary base station, in response to the length of time being equal to or longer than the predetermined time.

DETAILED DESCRIPTION

In order to more clearly illustrate purposes, technical solution, advantages of the disclosure, the disclosure will be described in detail with reference to the drawings and embodiments. It should be understood that detailed embodiments provided herein are only used to explain but not to limit the disclosure.

It is noted that the "first", "second", and the like are used in this disclosure to distinguish similar objects but cannot be understood as indicating a specific order or sequence.

Figure 1:
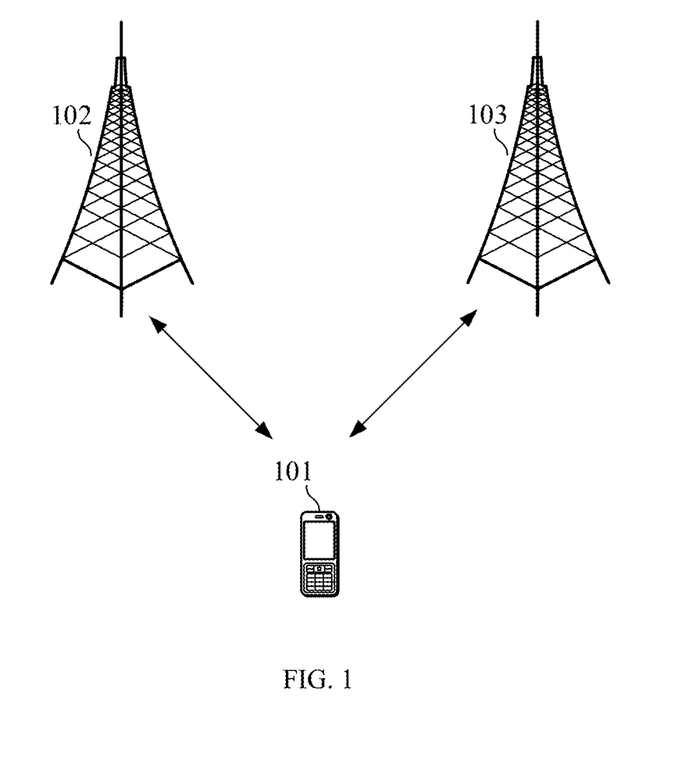
FIG. 1 is a schematic architecture diagram of a dual connectivity according to an embodiment of the disclosure.

An embodiment of the disclosure provides a method for controlling a network connection, which can be applied to a dual connectivity architecture illustrated in FIG. 1. A terminal 101 can establish a radio connection with a master base station 102 (also referred to as a master node), thereby realizing communication with the master base station 102. The terminal 101 can establish a radio connection with a secondary base station 103 (also referred to as a secondary node), thereby realizing communication with the secondary base station 103. The terminal 101 can further simultaneously establish radio connections with both of the master base station 102 and the secondary base station 103, thereby simultaneously realizing communication with the master base station 102 and the secondary base station 103.

In a dual connectivity mode, the terminal 101 simultaneously establish two connections with the master base station 102 and the secondary base station 103, respectively. The master base station 102 is substantially configured for transmitting signaling, and the secondary base station 103 is substantially configured for transmitting data. The technical solution of embodiments of the disclosure is mainly aimed at a type of terminal supporting the dual connectivity mode.

Types of the master base station 102 and the secondary base station 103 illustrated in FIG. 1 may be the same or different. In an implementation, the master base station 102 is an LTE base station, and the secondary base station 103 is an NR base station. In another implementation, the master base station 102 is an NR base station, and the secondary base station 103 is also an NR base station. In still another implementation, the master base station 102 is an NR base station, and the secondary base station 103 is an LTE base station. The embodiments of the disclosure do not limit the types of the master base station 102 and the secondary base station 103.

In one embodiment, the dual connectivity mode is an EUTRA-NR Dual Connection (EN-DC) mode or a next generation EN-DC (NGEN-DC) mode. In this case, the master base station is an LTE base station, the secondary base station is an NR base station, and the terminal communicates with both of the LTE base station and the NR base station.

In another embodiment, the dual connectivity mode is an NR Evolved UMTS Terrestrial Radio Access (NR-EUTRA, NE-DC) mode. In this case, the master base station is an NR base station, the secondary base station is an LTE base station, and the terminal communicates with both of the LTE base station and the NR base station.

It should be noted that, the dual connectivity mode is not limited to the above EN-DC mode or NE-DC mode. The specific type of the dual connectivity mode is not limited in the embodiments of the disclosure.

In a specific implementation, a deployment manner of the master base station and the secondary base station may be a co-site deployment (for example, an NR base station and an LTE base station may be set on the same entity device), or may be non-co-site deployment (for example, an NR base station and an LTE base station may be set on different entity devices), which may not be limited in the disclosure. Here, the LTE base station may also be referred to as an evolved Node B (eNB), and the NR base station may also be referred to as a next generation Node B (gNB). It should be noted that a relationship between coverages of the master base station and the secondary base station are not be limited in the disclosure. for example, the coverages of the master base station and the secondary base station may be overlapped.

The disclosure may not limit a specific type of the terminal 101. The terminal 101 may be any user equipment supporting the foregoing dual connectivity mode. For example, the user equipment may be a smart phone, a personal computer, a notebook computer, a tablet computer, a portable wearable device, and the like.

The technical solution of the disclosure and how to solve technical problems by the technical solution of the disclosure will be described below in detail through embodiments with reference to the drawings. The following several embodiments can be combined with each other, and the same or similar concepts or processes may not be repeated in some embodiments.

In addition, the technical solution described in the embodiments of the disclosure can be arbitrarily combined without conflict.

Figure 2:
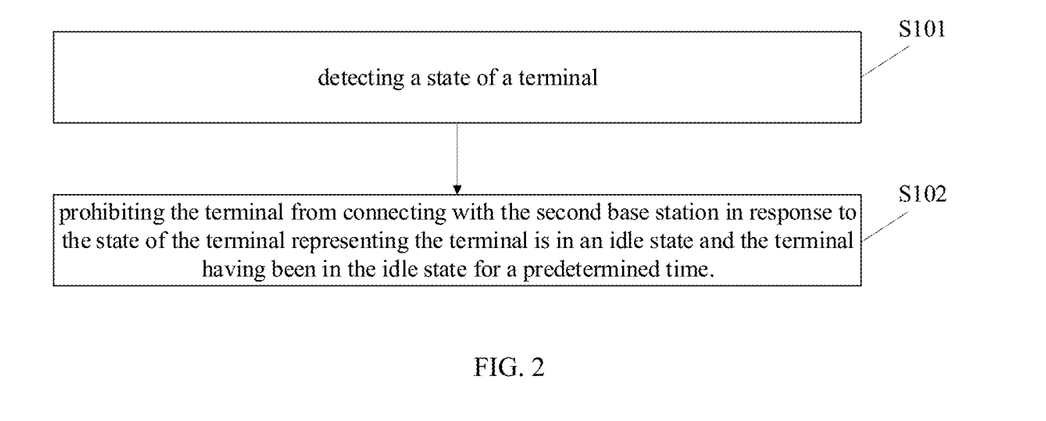
FIG. 2 is a schematic flowchart of a method for controlling a network connection according to an embodiment of the disclosure.

An embodiment of the disclosure provides a method for controlling a network connection. As illustrated in FIG. 2, the method includes block S101 and block S102.

At block S101, a state of a terminal is detected.

The terminal is configured to communicate with both of a first base station and a second base station in the dual connectivity mode. The state of the terminal represents a connection state between the terminal and a first network where the first base station locates.

In the embodiment of the disclosure, the method for controlling the network connection is implemented on a premise of the terminal supporting the dual connectivity mode. In an implementation, the method is implemented when the terminal is in the dual connectivity mode.

At block S101, according to the embodiment of the disclosure, that the first base station is a master base station and the second base station is a secondary base station in actual application is taken as an example for illustration. The secondary base station is configured for transmitting data and the master base station is substantially configured for transmitting signaling (certainly, it can also be responsible for transmitting signaling and part of the data). As illustrated in FIG. 1, the terminal, the first base station and the second base station form a dual connectivity architecture.

In the embodiment of the disclosure, the dual connectivity mode can be, such as, an EN-DC mode, an NGEN-DC mode, or an NE-DC mode. Taking the EN-DC mode as an example, the first base station is a NR base station (i.e., gNB), the second base station is an LTE base station (i.e., eNB), and the terminal simultaneously communicate with both of the NR base station and the LTE base station.

In actual application, the first base station and the second base station may be different types of base stations, that is, a second network where the second base station locates is a different network from a first network.

It will be described below by taking the second base station as a NR base station for example.

In the embodiment of the disclosure, the terminal may detect a state of itself to acquire a connection status between itself and a first network where the first base station locates.

In an implementation, when the first base station is the LTE base station and the second base station is the NR base station, the terminal prohibiting itself from connecting with the second base station in response to the terminal detecting a network for 4G (corresponding to the first base station) and the terminal is in the idle state.

It is noted that, in the dual connectivity mode, under the condition that the terminal is in the idle state for the network of the first base station, a network connection between the terminal and the second base station will also fail to connect.

In several embodiments of the disclosure, the terminal can acquire an idle state query request report through an idle state query request. The idle state query request represents querying the connection status between the terminal and the network where the first base station locates and the idle state query request report indicates the state of the terminal. The idle state query request report may be also named as a report for the idle state request. It can be understood that the state of the terminal in the dual connectivity mode can be the idle state or a connected state. The idle state indicates that the terminal has established the communication connection with the first network where the first base station locates. The connected state indicates that the terminal does not establish the communication connection with the master base station. In an implementation, the idle state query request report indicates the terminal is in the idle state.

A duration of the idle state is a length of time for which the idle state has lasted, and the duration of the idle state can be determined according to the report. In an implementation, the report further includes time information for the state of the terminal, and the duration of the idle state starts from the time that the state of the terminal changed from the connected state to the idle state. In another implementation, the duration of the idle state starts from the time at which acquiring the report indicating that the state of the terminal changed from the connected state to the idle state. In an implementation, the idle state query request is sent to a modem corresponding to the first base station, and a report for the idle query request is acquired from the modem corresponding to the first base station. Further, the idle state query is sent to the modem corresponding to the first base station at predetermined intervals.

Figure 3:
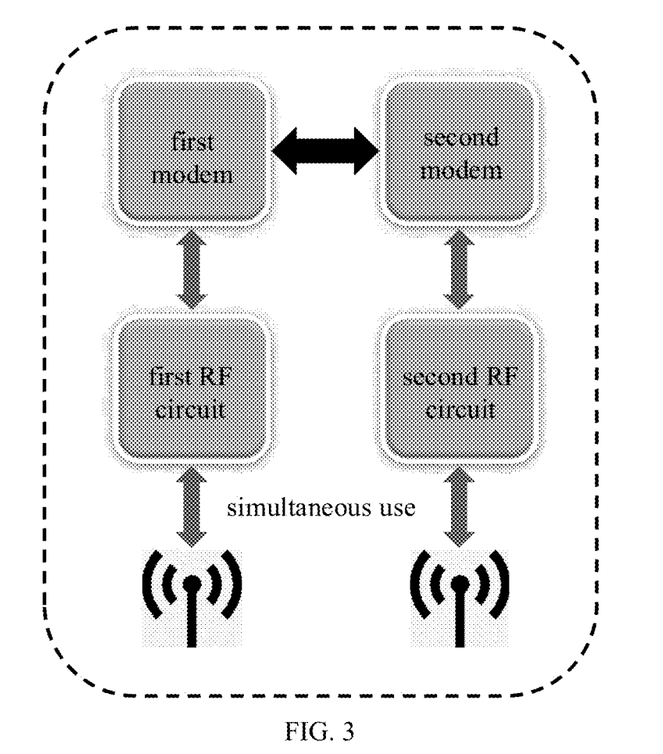
FIG. 3 is a schematic structural diagram of a communication module of a terminal in a dual connectivity mode according to an embodiment of the disclosure.

It should be noted that, as illustrated in FIG. 3, the terminal is required to be equipped with two communication modules to realize simultaneous communication with the two base stations, and the two communication modules correspond to the first base station and the second base station, respectively. A first communication module consists of a first modem and a first radio frequency (RF) path (including a first RF circuit and a first RF antenna), and the first communication module corresponds to the first base station. A second communication module consists of a second modem and a second RF path (including a second RF circuit and a second RF antenna), and the second communication module corresponds to the second base station.

In an embodiment, the second modem is a 5G modem, the first modem is a 4G modem, the second RF circuit is a 5G RF circuit, and the first RF circuit is a 4G RF circuit. In the dual connectivity mode, the first communication module and the second communication module work simultaneously.

Based on this, a process, in which the terminal according to the embodiment of the disclosure acquires the idle state query request report through the idle state query request, and the idle state query request report indicates that the terminal is in the idle state, may include: a power optimization module in the terminal sends the idle state query request to the first modem, the first modem sends the idle state query request report to the power optimization module in response to the idle state query request, and the idle state query request report indicates that the terminal is in the idle state.

Figure 4:
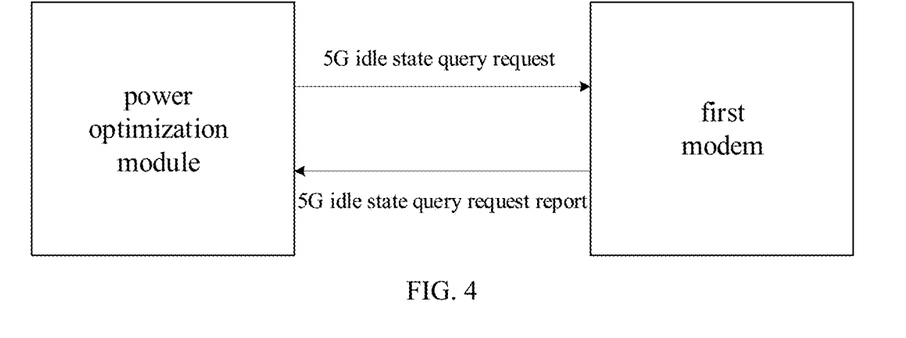
FIG. 4 is a schematic implementation diagram of a terminal acquiring a state thereof according to an embodiment of the disclosure.

In an implementation, as illustrated in FIG. 4, the second modem is a 5G modem, the first modem is a 4G modem, the power optimization module in the terminal sends a 5G idle state query request to the first modem, the first modem sends the 5G idle state query request report to the power optimization module in response to the 5G idle state query request, and the 5G idle state query request report indicates that the terminal is in the idle state. It is noted that, when the terminal is in the idle state, the terminal fails to connect with the network of the second base station.

At block S102, the terminal is prohibited from connecting with the second base station in response to the state of the terminal representing the terminal is in an idle state and the terminal having been in the idle state for a predetermined time.

At block S102, the state of the terminal may be a connected state or an idle state, when the terminal has acquired the state of itself. Only in response to the idle state lasting for a certain period of time, it is determined that the terminal in the idle state is normal and then a power consumption reduction can be processed, and at this time the terminal can be prohibited from connecting with the second base station. The certain period of time can be defined as a predetermined time. That is, the duration of the idle state is compared with the predetermined time, when the state of the terminal is detected as the idle state. The terminal is still capable of communication with both of the first base station and the second base station, when the duration of the idle state is within the predetermined time.

In the embodiments of the disclosure, the predetermined time may be 5 minutes, or, the predetermined time can be determined dynamically or fixedly according to an implemented network connectivity condition, which is not limited in the embodiments of the disclosure.

Based on FIG. 3, the terminal according to the embodiment of the disclosure can deactivate a modem corresponding to the second base station in the dual connectivity mode, i.e., the second modem, thereby prohibiting the terminal from connecting with the second base station.

It should be noted that, in the embodiments of the disclosure, the terminal deactivates the modem corresponding to the second base station, i.e., deactivating hardware device for network communication, to be prohibited from connecting with the second base station, in response to the terminal being unconnected with a network.

Figure 5:
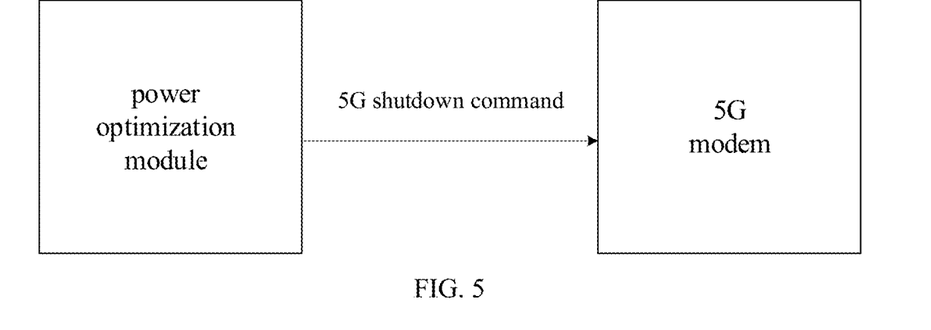
FIG. 5 is a schematic diagram of prohibiting a terminal from connecting to a second base station according to an embodiment of the disclosure.

In an implementation, as illustrated in FIG. 5, a power optimization module in the terminal sends a 5G shutdown command to the 5G modem to deactivate the 5G modem, in response to the terminal being unconnected with a network.

It can be understood that, in the embodiments of the disclosure, the terminal in the dual connectivity mode consumes more power than the terminal in a single connectivity mode (the terminal communicates with one base station, such as an LTE base station or an NR base station). Therefore, the embodiments of the disclosure prohibit the terminal from connecting with the secondary base station in response to the terminal being in the idle state, thereby saving power consumption of the terminal.

In some embodiments of the disclosure, the state of the terminal is detected in response to the terminal activating a function for connecting with the second base station. The detecting the state of the terminal may include: a function of the terminal for connecting with the second base station is activated, and the state of the terminal in response to the terminal being connected with the second base station is detected. In actual application, the terminal needs to adjust various parameters thereof according to actual situation, after activating a communication function corresponding to the second base station, i.e., after activating the function for connecting with the second base station, thereby achieving a best compromise between performance and power consumption, and improving user experience.

Figure 6:
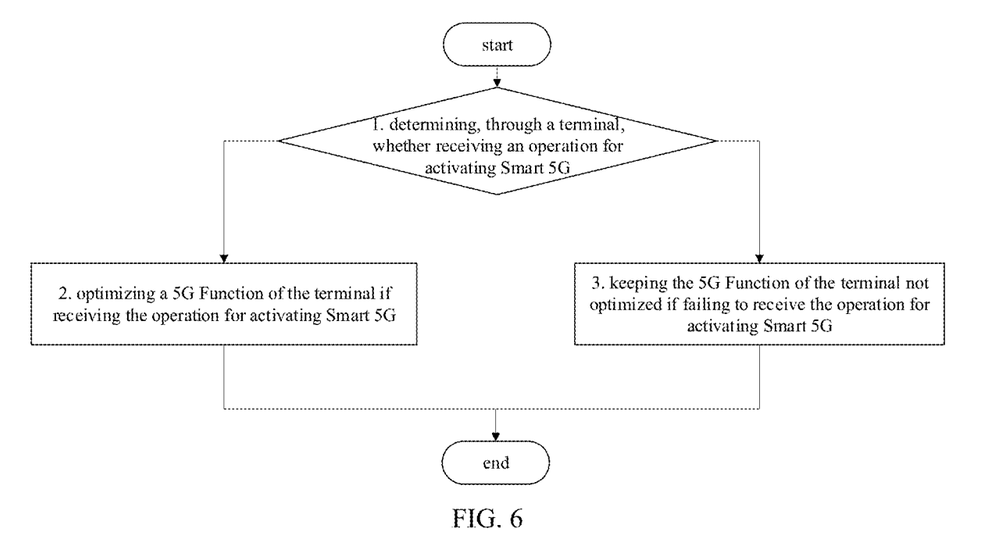
FIG. 6 is a schematic diagram of a terminal with a smart 5G function according to an embodiment of the disclosure.

In an implementation, taking the communication function corresponding to the second base station is 5G Function as an example, the first base station is an LTE base station, and the second base station is a NR base station. FIG. 6 illustrates a schematic diagram of a terminal activating Smart 5G. The activating Smart 5G refers to optimize the 5G Function. Specifically, the terminal is capable of deactivating the 5G Function according to an actual situation. As illustrated in FIG. 6, the terminal activating the Smart 5G includes the following block 1, block 2 and block 3.

Block 1: the terminal determines whether receiving an operation for activating Smart 5G.

The terminal displays a user interface, which includes an option for activating Smart 5G, that is the user interface includes an option for 5G function optimization. The terminal detects a selection of the option for 5G function optimization by a user. The user can trigger an operation to select the option corresponding to the Smart 5G, thereby activating the Smart 5G. The operation by the user can be a touch operation, a key operation, a voice operation, or a gesture operation, and the like.

Block 2: the 5G Function of the terminal is optimized, in response to receiving the operation for activating Smart 5G.

Optimization of 5G Function at least includes: the terminal is prohibited from connecting with the second base station, under a condition that the terminal has been in an idle state for a predetermined time.

It can be understood that the aforementioned method for controlling a network connection is performed, when a selection of the option for 5G function optimization is detected. That is, the state of the terminal is detected in response to the selection of the option for 5G function optimization by the user, and the terminal is prohibited from connecting with the second base station in response to that the state of the terminal represents the terminal has been in an idle state for a predetermined time.

Block 3: the 5G Function of the terminal keeps not optimized, in response to failing to receive the operation for activating Smart 5G.

It can be understood that, in the embodiments of the disclosure, the terminal can realize a control of activating and deactivating Smart 5G Function by setting a function control module for the Smart 5G Function, which provides an entry for setting the Smart 5G Function and enhances a function of the user interface.

Figure 7:
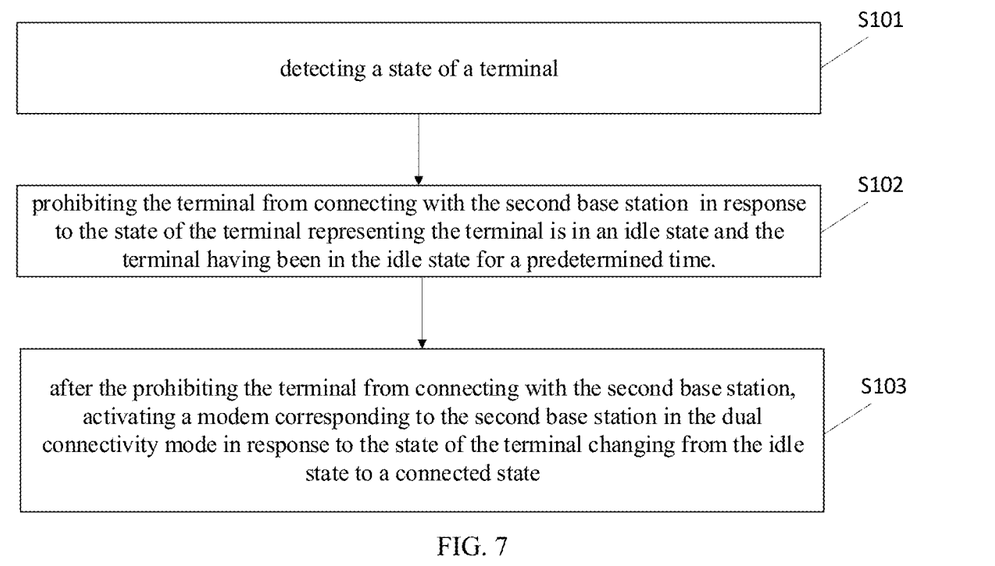
FIG. 7 is a schematic flowchart of another method for controlling a network connection according to an embodiment of the disclosure.

As illustrated in FIG. 7, a method for controlling a network connection, which is according to an embodiment of the disclosure further includes the following block S103.

At block S103, after prohibiting the terminal from connecting with the second base station, a modem corresponding to the second base station in the dual connectivity mode is activated in response to the state of the terminal changing from the idle state to a connected state.

In actual application of the disclosure, in response to the state of the terminal changing from the idle state to the connected state, the terminal can stop being prohibiting from connecting with the second base station, thereby significantly improving data transmission rate.

In the embodiment of the disclosure, a modem corresponding to the second base station in the dual connectivity mode is activated in response to the state of the terminal changing from the idle state to a connected state, thereby realizing a dual connectivity of the dual connectivity mode.

It should be noted that since the terminal deactivates the modem corresponding to the second base station to prohibit the terminal from connecting with the second base station, the terminal can activate the modem corresponding to the second base station in the dual connectivity mode to realize the dual connectivity of the dual connectivity mode, in response to the state of the terminal changing from the idle state to the connected state.

In some embodiments of the disclosure, the terminal does not establish a communication connection between itself and the master base station, when the terminal is in the idle state. The terminal has established the communication connection with the master base station, when the terminal is in the connected state. At this time, under a condition that the terminal is in the connected state, the terminal can send a random access request to the secondary base station to establish the communication connection with the secondary base station in response to the terminal needing to activate the dual connectivity mode, thereby realizing changing from the single connectivity mode to the dual connectivity mode.

Detecting a connection state between the terminal and the master base station can be understood as detecting the state of the terminal. The connection state indicates whether the terminal has established a communication connection with the master base station. A length of time for the connection state is compared with a predetermined time, and the length of time is for which the terminal does not establish the communication connection with the master base station. The terminal is prohibited from connecting with the secondary base station, under a condition that the length of time is equal to or longer than the predetermined time.

It can be understood that, when the terminal is prohibited from connecting with the second base station, the terminal can adjust in real time based on the change of the state thereof, so as to ensure successful implementation of data transmission and dual connectivity.

Figure 8:
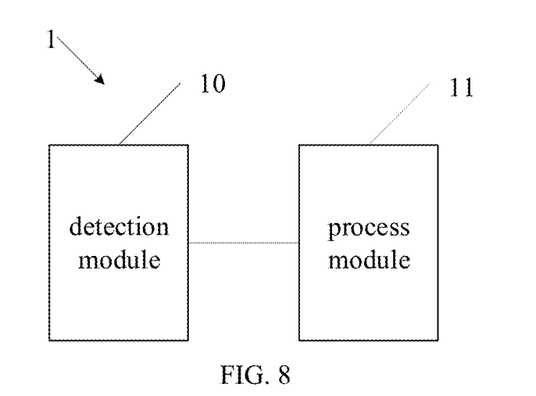
FIG. 8 is a schematic structural diagram of a terminal according to an embodiment of the disclosure.

To implement the method for controlling a network connection provided in the embodiments of the disclosure, an embodiment of the disclosure provides a terminal. As illustrated in FIG. 8, the terminal 1 includes a detection module 10 and a processing module 11.

The detection module 10 is configured to detect a state of a terminal. The terminal supports a dual connectivity mode, the terminal communicates with both of a first base station and a second base station in the dual connectivity mode, the first base station is a master base station, the second base station is a secondary base station, and the state of the terminal represents a connection status between the terminal and a first network where the first base station locates.

The processing module 11 is configured to prohibit the terminal from connecting with the second base station in response to the state of the terminal representing the terminal is in an idle state and the terminal having been in the idle state for a predetermined time.

In some embodiments of the disclosure, the detection module 10 is further configured to acquire an idle state query request report through an idle state query request, and the idle state query request report indicates the terminal is in the idle state.

In some embodiments of the disclosure, the processing module 11 is further configured to deactivate a modem corresponding to the second base station in the dual connectivity mode, thereby prohibiting the terminal from connecting with the second base station.

In some embodiments of the disclosure, the processing module 11 is further configured to activate a modem corresponding to the second base station in the dual connectivity mode in response to the state of the terminal changing from the idle state to a connected state, after the terminal is prohibited from connecting with the second base station, thereby realizing a dual connectivity of the dual connectivity mode.

In some embodiments of the disclosure, the detection module 10 is further configured to detect the state of the terminal in response to that the terminal activating a function for connecting with the second base station.

In actual implementation, the detection module 10 and the processing module 11 can be realized by a processor in the terminal in combination with a communication interface. Certainly, the processor is required to run programs stored in the memory to implement functions of each of the above-stated program modules.

It should be noted that, when the terminal provided in the foregoing embodiments performs controlling the network connection, division of the program modules above is merely used as an example for description. In actual application, the processing above can be allocated to different program modules according to requirements; that is, an internal structure of the apparatus is divided into different program modules to complete all or some of the processing described above. In addition, the terminal provided in the foregoing embodiments and the embodiments of the method for controlling the network connection belong to the same concept. For a specific implementation process, reference is made to the method embodiments. The details are not repeated here again.

Based on hardware implementation of the above program modules, and in order to implement the method in embodiments of the disclosure, embodiments of the disclosure further provide a terminal. The terminal is configured to communicate with both of the first base station and a second base station in a dual connectivity mode. The terminal includes a memory and a processor being coupling to the memory. The memory stores programs which, when being executed by the processor, cause the processor to implement: detecting a connection status between the terminal and a network where the first base station locates; and prohibiting the terminal from connecting with the second base station in response to that the connection status indicates the terminal is in an idle state and the terminal has been in the idle state for a predetermined time.

Further, the terminal includes a first modem and a second base station, the first base station corresponds to the first base station, the second modem corresponds to the second base station, and both of the first modem and the second modem are activated in the dual connectivity mode.

Further, the detecting a connection status between the terminal and a network where the first base station locates includes: an idle state query request is sent to the first modem; and a report for the idle state query request is acquired from the first modem, where the report indicates the connection status.

Further, the prohibiting the terminal from connecting with the second base station in response to that the connection status indicates the terminal is in an idle state and the terminal has been in the idle state for a predetermined time includes operations of: determining a duration of the idle state of the terminal according to the report for the idle state query request, where the idle state query request is sent to the first modem at predetermined intervals, and the duration of the idle state starts from a time that the state of the terminal changes from a connected state to the idle state; and prohibiting the terminal from connecting with the second base station in response to the duration of the idle state being equal to or longer than the predetermined time.

Further, the prohibiting the terminal from connecting with the second base station includes deactivating the second modem.

Further, the processor is further caused to implement operation of: activating the second modem in response to the connection status indicating that the terminal changes from the idle state to a connected state, after the second modem is deactivated.

Further, the first base station is a master base station, and the second base station is a secondary base station.

Further, the first base station is a Long Term Evolution base station, and the second base station is a New Radio base station, and the detecting a state of a terminal includes: a user interface is displayed, where the user interface includes an option for 5G function optimization; and the state of the terminal is detected in response to a selection of the option for 5G function optimization by a user.

It should be noted that other portions of the above operations can be referred to the aforementioned embodiments, which will not be repeated here again.

Figure 9:
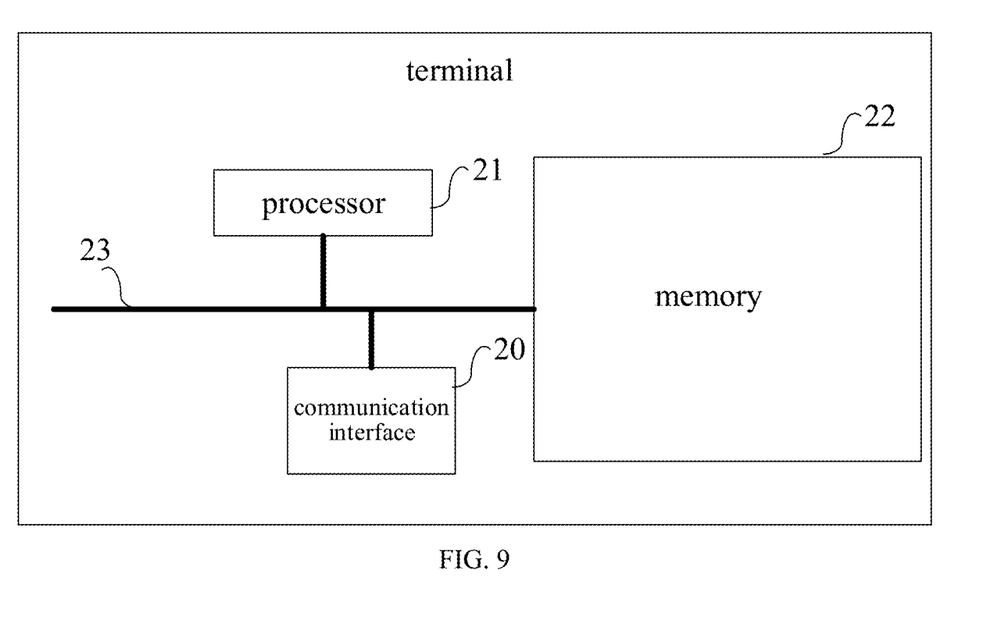
FIG. 9 is a schematic structural diagram of another terminal according to an embodiment of the disclosure.

FIG. 9 illustrates a schematic structure diagram of hardware components of the terminal in the embodiments of the disclosure. As illustrated in FIG. 9, the terminal includes the following components.

A communication interface 20 is configured to interact information with other devices, for example, network devices and the like.

A processor 21 connects with the communication interface 20, thereby realizing interacting information with network sides devices. The processor 21 is configured to implement operations in the method for controlling a network connection provided in the embodiments of the disclosure, when the processor 21 running computer programs. The computer programs are stored on the memory 22. Memory 22 is configured to store the computer programs capable of running on the processor.

Specifically, when the computer programs are implemented, the processor 21 is configured to detect a state of a terminal, where the terminal supports a dual connectivity mode, the terminal communicates with both of a first base station and a second base station in the dual connectivity mode, the first base station is a master base station, the second base station is a secondary base station, and the state of the terminal represents a connection status between the terminal and a first network where the first base station locates; and prohibit the terminal from connecting with the second base station under a condition that the state of the terminal represents the terminal has been in an idle state for a predetermined time.

Certainly, in actual use, various components in the terminal are coupled together via a bus system 23. It can be understood that the bus system 23 is configured to implement connection and communication between the components. In addition to a data bus, the bus system 440 further includes a power bus, a control bus and a status signal bus. However, for clearly illustrating, various buses are all denoted as the bus system 440 in FIG. 9.

The memory 22 in embodiments of the disclosure is configured to store various types of data to support operations on the terminal. For example, the data includes any computer programs configured to be implemented on the terminal.

It can be understood that the memory 22 may be a volatile memory or a non-volatile memory, or both. The non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disc, or a Compact Disc Read-Only Memory (CD-ROM). The magnetic surface storage is a magnetic disc storage or a magnetic tape storage. The volatile memory is a Random Access Memory (RAM) that serves as an external cache. By way of example instead of limitation, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synclink Dynamic Random Access Memory (SLDRAM), and a Direct Rambus Random Access Memory (DRRAM). The memory 22 described in the embodiments of the present disclosure is intended to include but is not limited to these memories and any other suitable types of memories.

The method disclosed in the embodiments of the present disclosure above may be applied to the processor 21, or implemented by the processor 21. The processor 21 may be an integrated circuit chip, and has a signal processing capability. In an implementation process, the operations in the methods above are completed by using an integrated logic circuit of hardware in the processor 21 or an instruction in a form of software. The processor 21 is a general-purpose processor, a DSP, another programmable logic component, a discrete gate or a transistor logic component, a discrete hardware component, or the like. The processor 21 may implement or execute the methods, operations, and logical block diagrams disclosed in the embodiments of the present disclosure. The general-purpose processor is a microprocessor, any conventional processor, or the like. The operations of the methods disclosed with reference to the embodiments of the present disclosure are directly implemented by a hardware decoding processor, or are implemented by using a combination of hardware and software modules in the decoding processor. The software modules are integrated in a storage medium, and the storage medium is integrated in the memory 83. The processor 21 reads information in the memory 83, in combination with hardware thereof, to implement the operations of the above-stated methods.

Optionally, the processor 21, when executing the program, realizes processes in the methods implemented by the terminal according to embodiments of the disclosure, which is not repeated herein for simplicity.

In an embodiment, a non-transitory storage medium stores program codes which, when being executed by a processor, cause the at least one processor to perform operations of: detecting a connection status between a terminal and a master base station, where the terminal is in a dual connectivity mode and capable of communicating with both of the master base station and a secondary base station, and the connection status indicates whether the terminal has established a communication connection with the master base station; comparing a length of time for the connection status with a predetermined time, where the length of time is for which the terminal does not establish the communication connection with the master base station; and prohibiting the terminal from connecting with the secondary base station, in response to the length of time being equal to or longer than the predetermined time.

Further, the prohibiting the terminal from connecting with the secondary base station includes that a modem corresponding to the secondary base station is deactivated.

Further, the processor is further caused to perform: activating a modem corresponding to the second base station in response to the terminal being detected to establish the communication connection with the master base station, after the prohibiting the terminal from connecting with the secondary base station.

In an embodiment, a storage medium is provided according to the disclosure. The storage medium stores computer programs thereon, and the computer programs, when being executed by the processor, implements operations in the method for controlling the network connection according to the embodiments of the disclosure.

For example, the storage medium, i.e., a computer readable storage medium, may be a memory 22 storing computer programs. The computer programs can be executed by the processor 21 of the terminal to complete the operations in the foregoing methods.

It should be noted that other portions of the above operations can be referred to the aforementioned embodiments, which will not be repeated here again.

The storage medium may be a memory, such as, a FRAM, a ROM, a PROM, an EPROM, an EEPROM, a Flash Memory, a magnetic surface memory, a CD-ROM, or a CD-ROM, and the like.

In several embodiments provided in the present application, it should be understood that the disclosed devices and methods may be implemented in another manner. The described device embodiments are merely exemplary. For example, the unit division is merely logical function division. In actual implementation, there may be another division manner. For example, multiple units or components are combined, integrated into another system, or some features are ignored, or not performed. In addition, the displayed or discussed components may be mutually coupled, or directly coupled, or communicatively connected by means of some interfaces, or indirectly coupled or communicatively connected by a device or unit, and may be electrically, mechanically, or in another form.

The foregoing units described as separate parts may or may not be physically separate, and parts displayed as units may or may not be physical units, may be located in one place, or may be distributed on multiple network units. Some or all of the units may be selected according to actual requirements to implement the objectives of the solutions in the embodiments.

In addition, all functional units in the embodiments of the present disclosure may be integrated into one processing unit, or each unit may be used as one unit, respectively, or two or more units may be integrated into one unit. The foregoing integrated unit may be implemented in a form of hardware, or may be implemented in a form of hardware plus a software functional unit.

A person of ordinary skill in the art may understand that all or some operations for implementing the foregoing method embodiments are achieved by a program by instructing relevant hardware. The foregoing program may be stored in a computer readable storage medium. When the program is executed, operations including the foregoing method embodiments are performed. Moreover, the foregoing storage medium includes any medium that may store program codes, such as a ROM, a RAM, a magnetic disc, or an optical disc.

Alternatively, if the integrated unit in the present disclosure is implemented in a form of a software function module and sold or used as an independent product, the integrated unit may also be stored in a computer-readable storage medium. Based on such an understanding, the technical solutions of the embodiments of the present disclosure essentially or the part contributing to the prior art may be implemented in a form of a software product. The computer software product is stored in one storage medium and includes several instructions for instructing a computer device (which may be a personal computer, a server, or a network device, and the like.) to execute all or part of the methods described in the embodiments of the present disclosure. The foregoing storage medium includes any medium that may store program code, such as a mobile storage device, a ROM, a RAM, a magnetic disc, or an optical disc.

Embodiments of the disclosure provide a method for controlling a network connection, a terminal and a non-transitory storage medium. A terminal detects a state of the terminal, where the terminal supports a dual connectivity mode, the terminal communicates with both of a first base station and a second base station in the dual connectivity mode, the first base station is a master base station, the second base station is a secondary base station, and the state of the terminal represents a connection condition between the terminal and a first network where the first base station locates; and the terminal is prohibited from connecting with the second base station under a condition that the state of the terminal represents the terminal has been in an idle state for a predetermined time. By using the above-mentioned technical solution, it represents the terminal is not connected to a network when the terminal detects itself is in the idle state, under a condition that the terminal supports the dual connectivity mode. In this case, prohibiting the terminal from connecting to the secondary base station can achieve an object of saving power consumption of the terminal, thereby improving endurance time of the terminal.

The foregoing description is only preferred embodiments of the disclosure and is not intended to limit the protection scope of the disclosure.

What is claimed is:

1. A method for controlling a network connection, comprising:
    detecting a state of a terminal, wherein the terminal is configured to communicate with both of a first base station and a second base station in a dual connectivity mode and the state of the terminal represents a connection status between the terminal and a network where the first base station locates; and
    prohibiting the terminal from connecting with the second base station in response to the state of the terminal representing the terminal is in an idle state and the terminal having been in the idle state for a predetermined time;
    wherein the detecting a state of a terminal comprises:
        sending an idle state query request to a modem corresponding to the first base station; and
        acquiring a report for the idle state query request report, from the modem corresponding to the first base station, wherein the report indicates the state of the terminal.

2. The method as claimed in claim 1, wherein the idle state query request is sent to the modem corresponding to the first base station at predetermined intervals.

3. The method as claimed in claim 1, wherein the prohibiting the terminal from connecting with the second base station comprises:
    deactivating a modem corresponding to the second base station in the dual connectivity mode, thereby prohibiting the terminal from connecting with the second base station.

4. The method as claimed in claim 1, further comprising:
    after the prohibiting the terminal from connecting with the second base station, activating a modem corresponding to the second base station in the dual connectivity mode in response to the state of the terminal changing from the idle state to a connected state.

5. The method as claimed in claim 1, wherein the detecting a state of a terminal further comprises:
    activating a function of the terminal for connecting with the second base station; and
    detecting the state of the terminal in response to the terminal being connected with the second base station.

6. The method as claimed in claim 1, wherein the first base station is a master base station, the second base station is a secondary base station.

7. The method as claimed in claim 1, wherein the first base station is a Long Term Evolution base station, and the second base station is a New Radio base station.

8. The method as claimed in claim 7, wherein the detecting a state of a terminal further comprises:
    displaying a user interface, wherein the user interface includes an option for 5G function optimization; and
    detecting the state of the terminal in response to a selection of the option for 5G function optimization by a user.

9. A terminal, wherein the terminal is configured to communicate with both of a first base station and a second base station in a dual connectivity mode, the terminal comprises a memory and a processor coupled to the memory, the memory stores programs which, when being executed by the processor, cause the processor to implement:
    detecting a connection status between the terminal and a network where the first base station locates; and
    prohibiting the terminal from connecting with the second base station in response to that the connection status indicates the terminal is in an idle state and the terminal has been in the idle state for a predetermined time;
    wherein the detecting a connection status between the terminal and a network where the first base station locates comprises:
        sending an idle state query request to a first modem corresponding to the first base station; and
        acquiring a report for the idle state query request from the first modem corresponding to the first base station, wherein the report indicates the connection status.

10. The terminal as claimed in claim 9, wherein the terminal comprises the first modem and a second base station modem, the first base station corresponds to the first base station, the second modem corresponds to the second base station, and both of the first modem and the second modem are activated in the dual connectivity mode.

11. The terminal as claimed in claim 10, wherein the prohibiting the terminal from connecting with the second base station in response to that the connection status indicates the terminal is in an idle state and the terminal has been in the idle state for a predetermined time comprises:
    determining a duration of the idle state of the terminal according to the report for the idle state query request, wherein the idle state query request is sent to the first modem at predetermined intervals, and the duration of the idle state starts from a time that the state of the terminal changes from a connected state to the idle state; and
    prohibiting the terminal from connecting with the second base station in response to the duration of the idle state being equal to or longer than the predetermined time.

12. The terminal as claimed in claim 10, wherein the prohibiting the terminal from connecting with the second base station comprises: deactivating the second modem.

13. The terminal as claimed in claim 12, wherein the processor is further caused to implement:
    activating, after the second modem is deactivated, the second modem in response to the connection status indicating that the terminal changes from the idle state to a connected state.

14. The terminal as claimed in claim 9, wherein the first base station is a master base station, and the second base station is a secondary base station.

15. The terminal as claimed in claim 9, wherein the first base station is a Long Term Evolution base station, and the second base station is a New Radio base station; wherein the detecting a connection status further comprises:
    displaying a user interface, wherein the user interface includes an option for 5G function optimization; and detecting the connection status in response to a selection of the option for 5G function optimization by a user.

16. A non-transitory storage medium, wherein the non-transitory storage medium stores program codes which, when being executed by a processor, cause the processor to perform:
- detecting a connection status between a terminal and a master base station, wherein the terminal is in a dual connectivity mode and capable of communicating with both of the master base station and a secondary base station, and the connection status indicates whether the terminal has established a communication connection with the master base station;
- comparing a length of time for the connection status with a predetermined time, wherein the length of time is for which the terminal does not establish the communication connection with the master base station; and
- prohibiting the terminal from connecting with the secondary base station, in response to the length of time being equal to or longer than the predetermined time;
- wherein the detecting a connection status between a terminal and a master base station comprises:
- sending an idle state query request to a modem corresponding to the master base station; and
- acquiring a report for the idle state query request report from the modem corresponding to the master base station, wherein the report indicates the connection status between the terminal and the master base station.

17. The non-transitory storage medium as claimed in claim 16, wherein prohibiting the terminal from connecting with the secondary base station comprises:
- deactivating a modem corresponding to the secondary base station.

18. The non-transitory storage medium as claimed in claim 17, wherein the processor is further caused to perform:
- activating the modem corresponding to the secondary base station in response to the terminal being detected to establish the communication connection with the master base station, after the prohibiting the terminal from connecting with the secondary base station.

19. The non-transitory storage medium as claimed in claim 16, wherein the processor is further caused to perform:
- sending the idle state query request to the modem corresponding to the master base station at predetermined intervals.

20. The non-transitory storage medium as claimed in claim 16, wherein the processor is further caused to perform:
- determining the length of time according to the report for the idle state query request, and the length of time starts from a time that the connection status changes from a connected state in which the terminal establishes the communication connection with the master base station, to an idle state in which the terminal does not establish the communication connection with the master base station; and
- prohibiting the terminal from connecting with the secondary base station in response to the length of time being equal to or longer than the predetermined time.

* * * * *